Oct. 17, 1933.  C. R. KEITH  1,931,025
SOUND FILM RECORDING APPARATUS
Filed Oct. 15, 1931
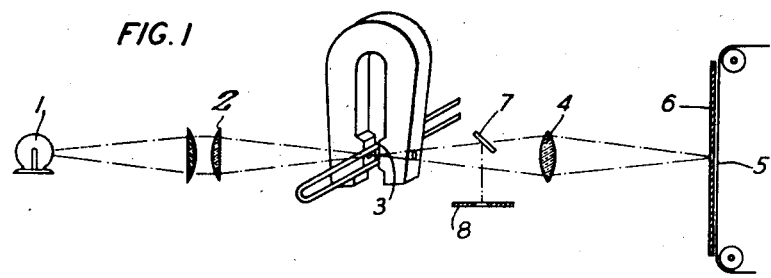
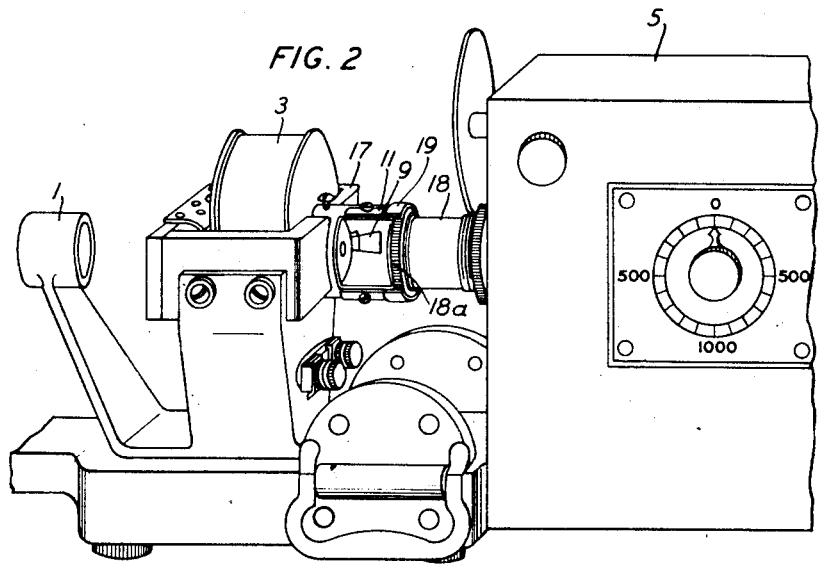
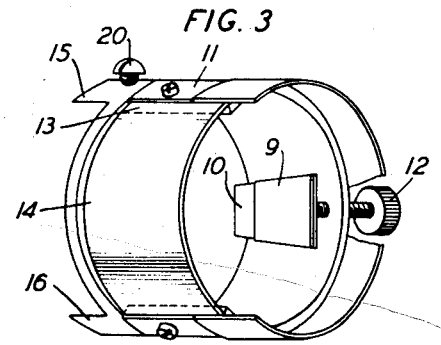
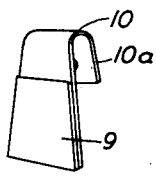
INVENTOR
C.R. KEITH
BY
G. H. Heydt
ATTORNEY Patented Oct. 17, 1933

1,931,025

UNITED STATES PATENT OFFICE 1,931,025

SOUND FILM RECORDING APPARATUS

Clyde R. Keith, London, England, assignor to Electrical Research Products, Inc., New York, N. Y., a corporation of Delaware Application October 15, 1931, Serial No. 568,958, and in Great Britain November 29, 1930

4 Claims. (Cl. 274—5)

This invention relates to apparatus for controlling light in accordance with oscillating or varying phenomena of the kind in which light from a source is controlled by an optical valve or shutter operated in response to the phenomenon.

Such optical valves or shutters are generally so adjusted that, in the absence of the phenomenon they permit to pass an amount of light intermediate between the maximum and minimum. If, however, this setting is not correct, or if the amplitude of variation of the phenomenon is excessive, distortion may be produced owing to the cutting off of the peaks of variations in one or both directions.

According to the present invention a light reflecting body is disposed to intercept part of the light issuing from the optical valve or shutter and to deflect some of the light thereof to the eye of an operator so that the operator may observe any changes in the average amount of light falling thereon over short periods of time. The light reflecting body preferably has a white diffusely reflecting flat surface.

When the optical valve or shutter is overloaded or its normal setting is incorrect, it may completely cut off or extinguish the light during a part of one half-cycle of the variation of the phenomenon but increase the illumination in proportion to the current on the alternate halves of the cycle. In such case the apparent illumination of the light reflecting body is increased during the operation of the optical valve or shutter and returns to normal upon the decrease or cessation of the phenomenon. If the phenomenon is of variable intensity and overloads the optical valve or shutter intermittently, a corresponding intermittent flicker of the illumination of the reflecting body will be observed. Any non-linearity of response of the light valve or shutter, under alternating excitation, will be revealed by change of the illumination of the reflecting body following change in amplitude of the excitation or cessation or commencement of the excitation.

The nature of the invention will be clearly understood from the following description with reference to the accompanying drawing in which:

Fig. 1 is a diagram illustrating how the invention is applied;

Fig. 2 shows part of the sound recording apparatus in which the invention is embodied;

Fig. 3 illustrates the mounting of the light reflecting surface used in the embodiment shown in Fig. 2, and Fig. 4 is a detailed view showing the reflecting surface and supporting bracket therefor.

Referring to Fig. 1 it will be seen that the figure comprises a diagram of the usual recording system for producing sound films in which the light is modulated in accordance with sound variations by means of an optical valve or shutter.

The arrangement comprises an exciting lamp 1, light from which is collected by a condensing lens system 2 and focussed upon the ribbons and slit of a light valve 3, which in the particular embodiment of the invention described is a light valve operating on the principle of the well known Einthoven string galvanometer but having two strings arranged to move in opposite directions in the same plane of current flow therethrough. An image of the slit between the strings or ribbons of the light valve is focussed by an objective lens system 4 upon a photographic film 5 mounted in a suitable casing or other structure 6.

In the application of the present invention to the system illustrated a light reflecting surface such as a piece of white paper, card, or the like, indicated by the numeral 7, is mounted obliquely to the optical axis of the system in such a manner that it intercepts part of the diverging pencil of light issuing from the slit between the strings or ribbons of the light valve and falling upon the objective lens. The card or the like 7 may be mounted on a tube of sufficient diameter to permit the passage of the light beam through it without any of the light thereof being stopped, this tube being provided with a viewing aperture indicated at 8 through which the reflecting surface may be viewed.

A convenient method of mounting the reflecting surface is shown in Fig. 2. The light reflecting surface consists of a piece of ivorine 9 or similar material applied to a strip of phospher bronze 10 having turned over end 10a and clearly shown in Fig. 4. This strip forms a flexible bracket support for the reflecting surface and is mounted in a tube 11 shown in detail in Fig. 3, adjacent a set screw 12 which is adapted to press on the strip 10 behind the reflecting surface 9 when the bracket is in position. The tube 11 is formed of any convenient material, brass for example, and has a cut-away portion 13 opposite a reflecting surface 9 through which the said surface may be viewed. If desired a piece of transparent covering material 14 may be placed over the cut-away portion 13. The arrangement shown in the drawing is of the type described and illustrated in a paper of Donald MacKenzie entitled "Sound Recording with the Light Valve" published in the "Transactions of the Society of Motion Picture Engineers", Vol.

12, September 1928, and in the "Bell System Technical Journal" Vol. 8, January, 1929, and the tube 11 is adapted to this particular arrangement by the provision at one end of the tube, of extensions 15 and 16 adapted to fit respectively over and under the frame of field magnet yoke 17 of the light valve indicated generally by the numeral 3.

The opposite end of the tube 11 is of such a length as to extend from the yoke 17 to the commencement of the tube 18 in which the objective lens system 4 referred to in connection with Fig. 1 is mounted and secured to the tube 18 by means of a clip 19 which may be slipped over the end of the tube 11 and the enlarged end 18a of the tube 18 when the two tubes are in juxtaposition or which may be prominently carried on the end of the tube 11. For further securing the tube 11 in place screws 20 may be provided in either or both the extensions 15 and 16 of the tube 11 for screwing into corresponding apertures provided in the yoke 17.

It will thus be seen that with this arrangement the angle of the reflecting surface 9 with respect to the optical axis of the beam can be readily adjusted by means of the set screw 12 so that the said surface reflects a sufficient quantity of light through the cut-away part or window 13 of the tube 11, and thus it is possible to determine readily whether the light valve is functioning properly. Preferably the bracket 10 is so formed that unless the set screw 12 is screwed in for some distance the reflecting surface 9 is entirely withdrawn from the path of the beam so that no light is cut off by the reflecting surface from the film except when it is required to test the operation of the light valve.

It will be appreciated that, while one application only of the invention has been described, the invention may also be applied to other forms of light valve, such, for example, as the well known combination of Nicol prisms and Kerr cell, or to the type of light valve consisting of an oscillograph with a tilting mirror arrangement cooperating with an obscuring edge or mask, or an optical wedge. Furthermore, the invention is applicable to many kinds of apparatus, other than sound recording apparatus. For example, it is applicable to television and like systems wherein light valves are used.

What is claimed is:

1. The combination in a sound film recording apparatus of a light source, a light modulating device, means to project light from said source to said device, a tube, optical means mounted in said tube to project an image of said modulating device to said film, a cylinder extending from said tube to said modulating device, said cylinder having a cut-away portion, a member having a diffusely reflecting surface flexibly attached at one end to the inner surface of said cylinder opposite the cut-away portion therein, and means for adjusting the position of said reflecting member.

2. The combination in a sound film recording apparatus having a light source, a light modulating device and means for projecting an image of said device to a photo-sensitive film, of a device for monitoring the operation of said modulating device, said monitoring device comprising a cylinder having an opening therein and extending from said image projecting means to said modulating device, a spring bracket member secured to the inner surface of said cylinder opposite the opening therein, a light reflecting member mounted on said spring bracket member, and means extending through said cylinder in contact with said bracket member for adjusting the position of said light reflecting member.

3. The combination in a sound film recording apparatus, a light source, a light modulating device, optical means to project a beam of light from said source to said modulating device, further optical means for projecting an image of said modulating device to said film, and means for monitoring the operation of said modulating device, said means comprising a cylindrical member extending from said image projecting means to said modulating device and having a cut-away portion therein, a spring bracket member attached at one end to the inner surface of said cylindrical member opposite the cut-away portion therein, a reflecting member mounted on one side and at the other end of said bracket member, and screw means extending through said cylindrical member contacting with another side of said bracket member for adjusting the position of said reflecting member in the light beam issuing from said modulating device.

4. Apparatus for recording light variations on photographic film, in combination, a source of light, a light modulating device, means to project a beam of light from said source to said modulating device, means to project an image of said modulating device to a photosensitive surface, monitoring means mounted between said modulating device and said image projecting means, said monitoring means comprising a reflecting surface, a support therefor adapted to withhold said reflecting surface from the path of the light beam issuing from said modulating device, and adjustable means opposing the action of said support to regulate the position of said reflecting member in said light beam.

CLYDE R. KEITH.